United States Patent Office — 2,755,281 — Patented July 17, 1956

2,755,281

SEMICARBAZONES OF PHENANTHROLINE-QUINONES

Jean Druey, Riehen, and Paul Schmidt, Therwil, Switzerland, assignors to Ciba Pharmaceutical Products, Inc., Summit, N. J.

No Drawing. Application September 15, 1953, Serial No. 380,350

Claims priority, application Switzerland May 5, 1950

4 Claims. (Cl. 260—287)

The present invention relates to the semicarbazones of 4,7-phenanthroline-5,6-quinones. The heterocyclic nuclei of these compounds may carry substituents, above all alkyl groups, especially lower alkyl groups, such as methyl, or halogen atoms.

The invention relates more particularly to the mono-semicarbazones of 4,7-phenanthroline-5,6-quinones the heterocyclic nuclei of which are unsubstituted or substituted by lower alkyl groups, such as methyl, especially the mono-semicarbazone of the formula

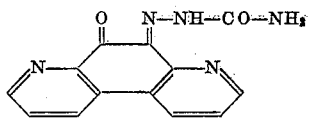

The new compounds possess valuable antibacterial and antiparasitic properties and can therefore be used therapeutically in human and veterinary medicine in the treatment of disorders caused by protozoa, especially amoeba.

The invention also comprises compositions of matter containing the new compounds and a solid or liquid pharmaceutical carrier. Such mixtures may, for example, be in the form of tablets, capsules or other dosage form suitable for peroral administration. Sterile liquid diluents can be used as carriers for injectable mixtures. For such purposes there may be used, for example, the usual pharmaceutical carriers provided they do not react with the new compounds. Depending on the use to be made of the compositions of matter, there may be used, e. g. water, vegetable oils, benzyl alcohol, polyethylene glycols, gelatine, starch, magnesium stearate and talcum.

The new compounds are obtained by reacting 4,7-phenanthroline-5,6-quinones with semicarbazide, advantageously in the form of its hydrochloride. The reaction is preferably conducted in the presence of a diluent, such as an alcohol, e. g., methanol. To prepare the mono-semicarbazones, it is advantageous to use about equimolecular quantities of the starting materials, whereas in the preparation of the disemicarbazones a substantial excess of semicarbazide is used.

The 4,7-phenanthroline-5,6-quinones and a process for their manufacture are disclosed in our copending patent application Serial No. 223,821, filed April 30, 1951, now Patent No. 2,706,197, of which the instant application is a continuation-in-part. According to said copending application, the 4,7-phenanthroline-5,6-quinones are obtained when a phenanthroline having a 5- or 6-positioned substituent convertible into an oxo group, e. g. a free or substitued hydroxyl group or an amino group, is oxidized with nitric acid, advantageously in the presence of sulfuric acid. The said 4,7-phenanthrolines which have in the 5- or 6-position a substituent convertible into an oxo group are known or can be obtained by conventional methods. Thus, correspondingly substituted phenylene diamines, which contain two hydrogen atoms attached to vicinal carbon atoms, may be subjected to a twofold Skraup synthesis. It is also possible to start from phenanthrolines which contain in the 5- or 6-position, for example, a halogen atom or a sulfo group, and to replace that substituent by a substituent convertible into an oxo group by oxidation. It may also be of advantage in the case of aminophenanthrolines, instead of forming the corresponding quinones directly, first to replace the amino groups by other especially suitable substituents, for example, a hydroxyl or alkoxy group, and only then to subject the product to oxidation with nitric acid.

The following examples illustrate the invention, the parts being by weight unless otherwise stated and the relationship of parts by weight to parts by volume being the same as that of the gram to the cubic centimeter:

Example 1

10 parts of 4:7-phenanthroline-5:6-quinone and 5.5 parts of semi-carbazide-hydrochloride are added to 500 parts by volume of methanol and boiled for 10 hours. After cooling, the yellow precipitate is isolated by suction-filtering and put into 200 parts by volume of water. The pH of the acid solution is adjusted to 6–7 with 1 N-caustic soda solution, whereby a yellow product is precipitated, which is recrystallized from much boiling methanol. The resultant mono-semicarbazone of 4:7-phenanthroline-5:6-quinone of the formula

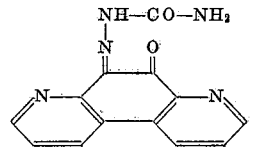

melts at 176° C. with decomposition. It contains 1 mol of crystal water.

The 4,7-phenanthroline-5,6-quinones used as starting material can be obtained as follows:

2 parts of 6-methoxy-4:7-phenanthroline are mixed with 10 parts by volume of concentrated sulfuric acid, and, while cooling with a mixture of ice and sodium chloride, with 6 parts by volume of fuming nitric acid (density=1.51), and the whole is heated for 2 hours at 120° C. The reaction solution is poured on to ice, its pH value is adjusted to 7 by means of a 10 N-solution of caustic soda, after standing for 2 hours the whole is filtered with suction to remove the precipitate which separates, and the latter is washed with hot water. After recrystallizing the product from methyl alcohol and drying it at 100° C. under 0.1 mm. pressure, there are obtained 1.8 parts (i. e. 90 per cent of the calculated yield) of 4:7-phenanthroline-5:6-quinone in the form of pale yellow crystals melting at 295° C. It has the formula

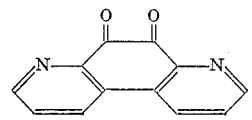

A composition of matter suitable for peroral application is obtained when, for example, 250 parts of the aforedescribed mono-semicarbazone are made into tablets with 65 parts of lactose, 5 parts of gelatine, 100 parts of wheat starch, 5 parts of stearine, 50 parts of maranta starch, and 25 parts of talcum.

Example 2

4 parts of 1-methyl-4:7-phenanthroline-5:6-quinone are heated to the boil for 8 hours with 2.2 parts of semi-carbazide-hydrochloride in 250 parts by volume of methanol. While the whole is allowed to cool, a yellow crystallizate separates. It is introduced into a small amount of water and the mixture given a pH of 7–8 with 2 N-caustic soda solution. The precipitated yellow product is suction-filtered and recrystallized from pyridine. There is thus obtained the mono-semicarbazone of 1-methyl-4:7-phenanthroline-5:6-quinone of melting point 218–219° C. in the form of yellow crystals.

In the same manner there can be obtained the mono-semicarbazone of 3-methyl-4:7-phenanthroline-5:6-quinone.

The 1-methyl-4:7-phenanthroline-5,6-quinone used as starting material can be prepared as follows:

147 parts of 8-methoxy-6-amino-quinoline, 364 parts of ferric chloride hexahydrate and 14 parts of anhydrous zinc chloride are introduced into a solution of 31 parts of hydrochloric acid gas in 600 parts by volume of ethyl alcohol. The mixture is heated on the water bath to 60–68° C. and 47 parts of methylvinyl ketone added dropwise in the course of 2 hours, the whole is refluxed for 2 hours and then allowed to stand overnight. The next morning the alcohol is evaporated, the residue basified with an aqueous caustic soda solution of 25 per cent strength, and extracted with much chloroform. The chloroform is dried with sodium sulfate and distilled off. There remains a brown product from which there can be obtained by recrystallization from glacial acetic acid 1-methyl-6-methoxy-4,7-phenanthroline of melting point 146–147° C.

20 parts of 1-methyl-6-methoxy-4,7-phenanthroline are mixed with 100 parts by volume of concentrated sulfuric acid and 60 parts by volume of fuming nitric acid (d.=1.51) with good cooling, and then heated to 120° C. for 2 hours. The whole is then poured on to 400 parts of ice and given a pH of 6–7 with 10 N-caustic soda solution. The neutral solution is extracted several times with chloroform and the chloroformic residue recrystallized from boiling methanol. There is thus obtained the 1-methyl-4:7-phenanthroline-5,6-quinone of the formula

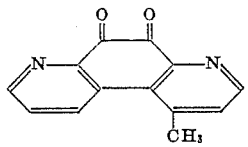

in the form of yellow crystals of melting point 219–220° C.

The 3-methyl-4,7-phenanthroline-5,6-quinone can be obtained in similar manner, namely as follows:

20 parts of 3-methyl-6-methoxy-4:7-phenanthroline are mixed with 100 parts by volume of concentrated sulfuric acid and, while cooling well, with 60 parts by volume of fuming nitric acid (density=1.51). The reaction solution is heated to 120° C. for 3 hours, then poured on to ice, and its pH value adjusted to 6–7 with 10 N-caustic soda solution. The yellow precipitate is separated by suction-filtering. From a little boiling methanol, the 3-methyl-4:7-phenanthroline-5:6-quinone of the formula

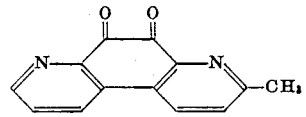

is obtained in the form of white crystals, which under reduced pressure decay at 100° C., while turning yellow and giving off methanol. The product melts at 230° C. with decomposition.

What is claimed is:

1. A semicarbazone compound selected from the group consisting of semicarbazones of 4,7-phenanthroline-5:6-quinone and 4:7-phenanthroline-5:6-quinones, the heterocyclic nuclei of which are substituted by a member selected from the group consisting of lower alkyl and halogen, and the therapeutically useful acid addition salts thereof.

2. The mono-semicarbazones of 4,7-phenanthroline-5:6-quinones, the heterocyclic nuclei of which are substituted by lower alkyl.

3. The mono-semicarbazone of 4,7-phenanthroline-5,6-quinone.

4. The mono-semicarbazone of 1-methyl-4,7-phenanthroline-5,6-quinone, melting at 218–219° C.

References Cited in the file of this patent

Linsker et al.: JACS, vol. 68, p. 403 (1946).
Kaufmann et al.: Ber. Deut. Chem., vol. 42, p. 2616 (1909).
Smith et al.: J. Org. Chem., vol. 12, p. 783 (1947).
Druey et al.: Helv. Chim. Acta, vol. 33, pp. 1080–7 (1950).